United States Patent
Huang

(10) Patent No.: US 6,654,817 B1
(45) Date of Patent: Nov. 25, 2003

(54) INTEGRAL PERIPHERAL DEVICE OF USB LOCAL NETWORK CARD AND USB MODEM

(75) Inventor: Cheng Ai Huang, Hsinchu (TW)

(73) Assignee: Abocom Systems, Inc., Hsinchu (TW)

( * ) Notice: Subject to any disclaimer, the term of this patent is extended or adjusted under 35 U.S.C. 154(b) by 442 days.

(21) Appl. No.: 09/653,322

(22) Filed: Sep. 1, 2000

(51) Int. Cl.$^7$ .............................................. G06F 13/00
(52) U.S. Cl. .................. 710/1; 710/7; 710/20; 710/36; 710/107; 710/313; 707/9; 705/18; 370/405
(58) Field of Search .......................... 710/1, 7, 20, 36, 710/107, 313; 707/9; 705/18; 370/405

(56) References Cited

U.S. PATENT DOCUMENTS 6,185,218 B1 * 2/2001 Ratcliff et al. ............... 370/405
2001/0011230 A1 * 8/2001 Morganstein et al. ......... 705/18
2002/0059235 A1 * 5/2002 Jecha et al. ..................... 707/9

* cited by examiner

Primary Examiner—Jeffrey Gaffin
Assistant Examiner—Mohammad O. Farooq
(74) Attorney, Agent, or Firm—Rosenberg, Klein & Lee

(57) ABSTRACT

An integral USB MODEM/USB LAN card peripheral comprises a first connector connected to a computer; a second connector connected to a telephone line; a third connector connected to LAN; a USB controller used to collect and dispatch internet data; wherein the USB controller has a micro-controller connected to a first memory, and a USB SIE (serial bus interface engine) connected between the first connector and the micro-controller. The micro-controller is connected to a MODEM module and an ether network media access controller through an internal bus, wherein the MODEM module is connected to the second connector for accessing Internet; and the ether network media access controller connected to the third connector through a physical layer for accessing LAN. Therefore, the present invention enables a computer to access LAN and Internet simultaneously; and the remote users to share compute resource with other users.

2 Claims, 6 Drawing Sheets

INTEGRAL PERIPHERAL DEVICE OF USB LOCAL NETWORK CARD AND USB MODEM

FIELD OF THE INVENTION

The present invention relates to a computer 1 peripheral device, especially to an integral peripheral device of USB local network card and USB modem.

BACKGROUND OF THE INVENTION

By the driving force of network application, the life cycles of computer products become extraordinary short. The assembling, maintainability, function, transmission speed and stability of computer products are essential competition factors.

FIG. 1 shows a conventional computer peripheral design, wherein a computer 10 is connected to a LAN card through a USB (universal series bus) 20 to access LAN (Local Area Network). FIG. 2 shows another conventional computer peripheral design, wherein a computer 10 is connected to a MODEM 40 through a USB (universal series bus) 20, and uses the MODEM 40 to access network through telephone line. However, the above-mentioned computer peripheral designs can provide accessing to a unique network, which is inconvenient to user.

FIG. 3 shows an improved computer peripheral design, wherein a computer 10 is connected to a hub 50 through a USB 20 such that the computer can simultaneous communicate to an LAN card 30 and a MODEM 40 through the hub 50. FIG. 4 shows the internal structure of the computer peripheral shown in FIG. 3. The computer 10 has an application program 12 communicates to a USB LAN driver program 15 and a USB MODEM driver program 16 through an NDIS (Network Device Interface Specification) 13 and a VCOMM (Virtual Communication) 14. The USB LAN driver program 15 and the USB MODEM driver program 16, together with a USB hub driver program 18 is connected to an external hub 50 through a USB system driver program 19 and a USB cable 20. When the computer is to access Internet or LAN, the USB system driver program 19 receive data from the USB LAN driver program 15 and the USB MODEM driver program 16 and sends the data to the hub 50. Afterward the hub 50 dispatches the data to a USB LAN card 30 or a USB MODEM 40. On the contrary, when the computer is to receive data from Internet or LAN, the hub 50 receives data from the USB LAN card 30 and the USB MODEM 40 and sends the data to the USB system driver program 19. Afterward the USB system driver program 19 dispatches the data from the USB LAN card 30 and the USB MODEM 40 to the USB LAN driver program 15 and the USB MODEM driver program 16, respectively. The data is then sent to the application program 12 through the NDIS13 and the VCOMM 14. However, for a notebook user, he must carry a USB hub, a USB LAN card and a MODEM with him to access LAN and Internet resource, this is inconvenient.

It is an object of the invention to provide an integral peripheral of LAN card and MODEM to provide convenient portability and reduce power consumption.

It is another object of the invention to provide an integral peripheral of LAN card and MODEM, by which a computer can access LAN and Internet simultaneously and the remote users can share compute resource with other users.

To achieve the above objects the present invention provides an integral USB MODEM/USB LAN card peripheral comprising a first connector connected to a computer; a second connector connected to a telephone line; a third connector connected to LAN; a USB controller used to collect and dispatch internet data; wherein the USB controller has a micro-controller connected to a first memory, and a USB SIE (serial bus interface engine) connected between the first connector and the micro-controller. The micro-controller is connected to a MODEM module and an ether network media access controller through an internal bus, wherein the MODEM module is connected to the second connector for accessing Internet; and the ether network media access controller connected to the third connector through a physical layer for accessing LAN.

The various objects and advantages of the present invention will be more readily understood from the following detailed description when read in conjunction with the appended drawing, in which:

DETAIL DESCRIPTION OF PREFERRED EMBODIMENT

Figure 5:
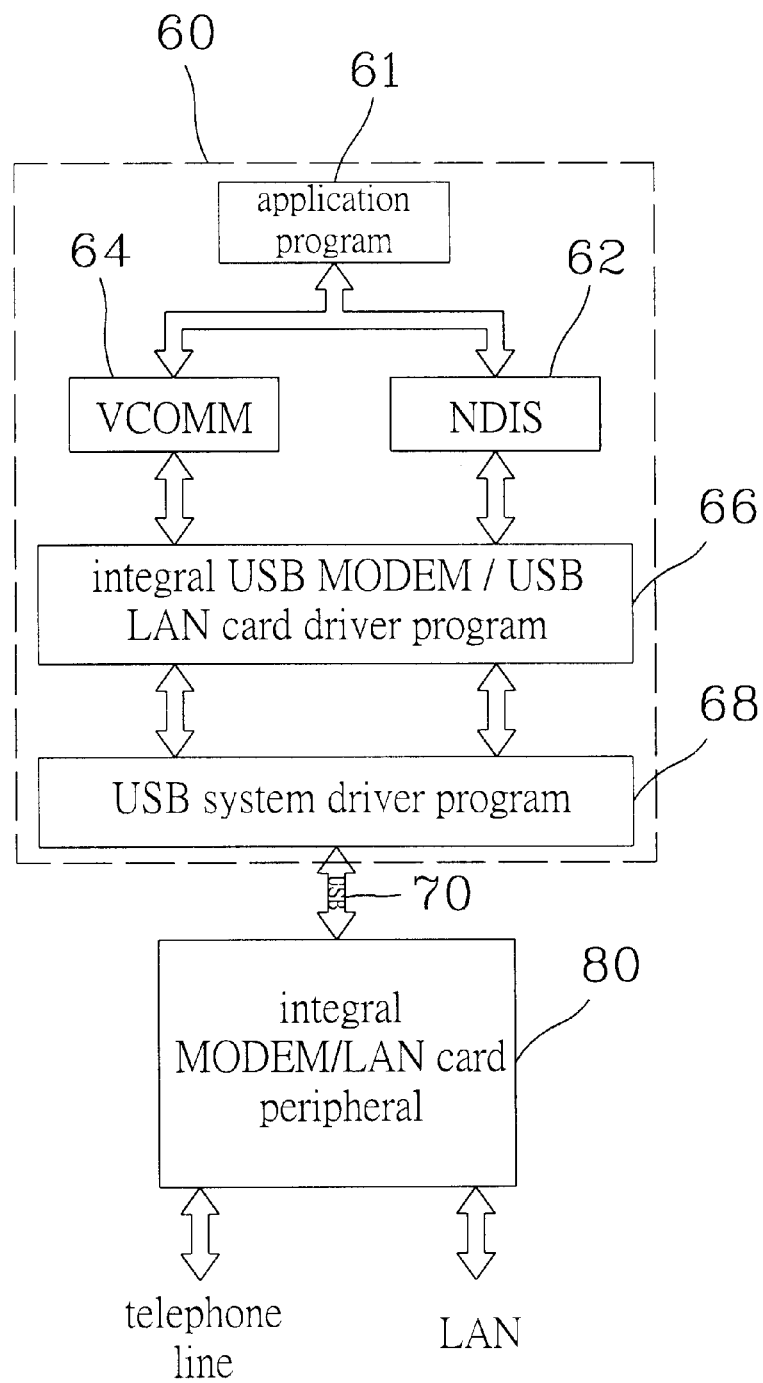
FIG. 5 shows the first embodiment of the present invention.

FIG. 5 shows the first embodiment of the present invention, a computer according to the invention comprises an application program 61, a NDIS 62, a VCOMM 64, an integral USB MODEM/USB LAN card driver program 66 and a USB system driver program 68. The integral USB MODEM/USB LAN card driver program 66 is provided between the NDIS 62 and the VCOMM 64, and the USB system driver program 68, and has driver program integrating the interface for the USB MODEM and the LAN card. The USB system driver program 68 is connected to an integral MODEM/LAN card peripheral 80.

Figure 6:
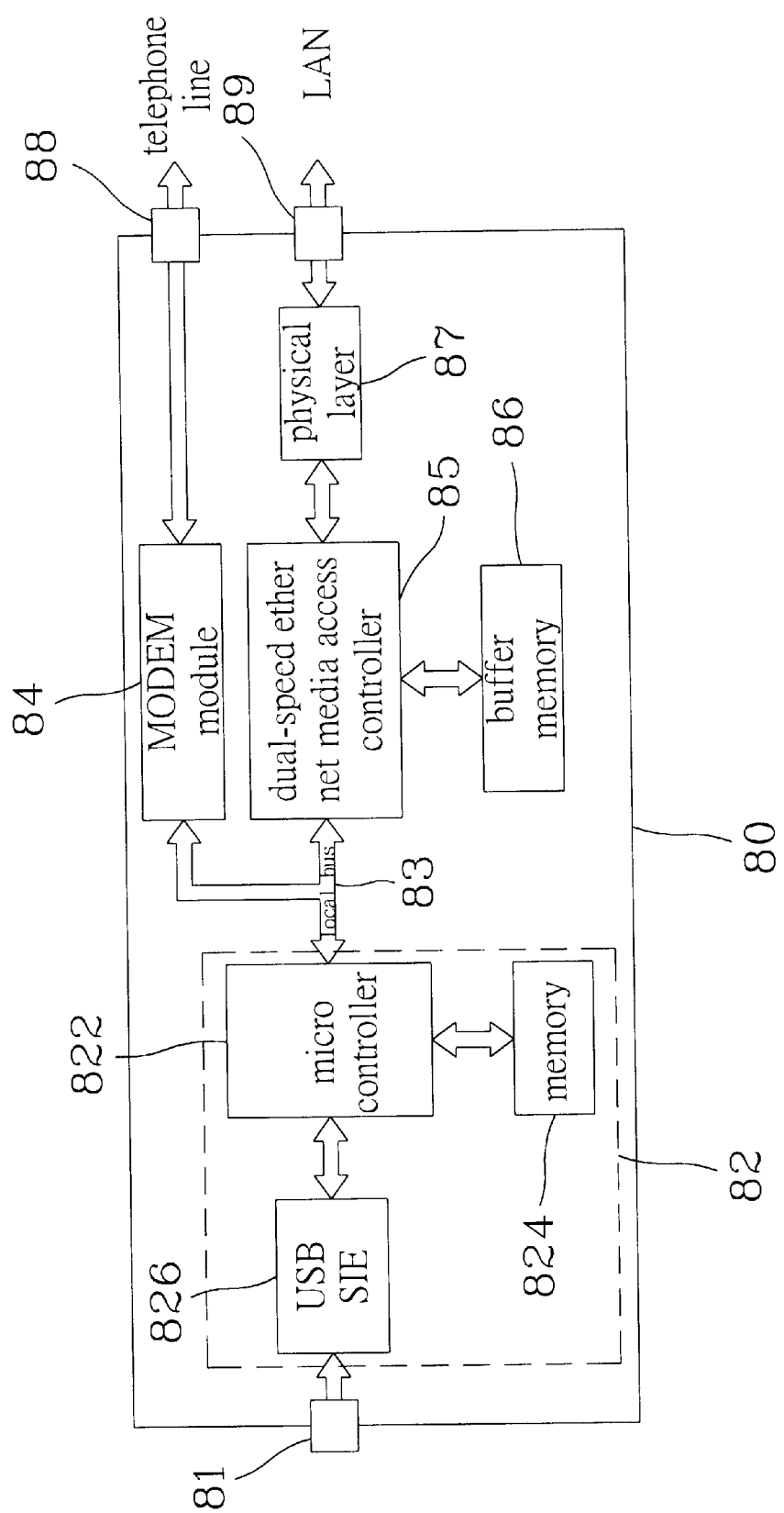
FIG. 6 shows the internal architecture of the integral MODEM/LAN card peripheral according to the present invention.

FIG. 6 shows the internal architecture of the integral MODEM/LAN card peripheral 80. The integral MODEM/LAN card peripheral 80 comprises a first connector 81 connected to the computer through a USB cable 70, a second connector 88 connected to telephone line, and a third connector 89 connected to LAN. The integral MODEM/LAN card peripheral 80 further comprises a USB controller 82 for managing USB interface protocol and processing data. The USB controller 82 comprises a micro controller 822, a memory 824 connected to the micro controller 822 and a USB SIE (USB series interface transceiver) 826 connected between the first connector 81 and the micro controller 822.

The micro controller 822 is connected to a MODEM module 84 and a dual-speed ether net media access controller 85 though an internal bus 83. The MODEM module 84 is connected to the second connector 88 and then accesses Internet through telephone line. The ether network media access controller 85 is connected to LAN through a physical layer 87 and a third connector 89 and connected to a buffer memory 86 for data buffer.

The integral USB MODEM/USB LAN card driver program 66 collects data sent from the NDIS 62 and the VCOMM 64, when the computer is to send data to LAN and Internet. The data is then sent to the USB controller 82 through the USB system driver program. Afterward, the USB controller 82 sends the data to the MODEM module 84 or the dual-speed ether net media access controller 85 according to the content of data, and then the data is sent to Internet or LAN through the second connector 88 or the third connector 89. When data from Internet or LAN is sent to the integral MODEM/LAN card peripheral 80, the USB controller 82 receives data sent from the MODEM module 84 or the dual-speed ether net media access controller 85 and then sends the data to the integral USB MODEM/USB LAN card driver program 66 through the NDIS 62 and the VCOMM 64, respectively. The integral USB MODEM/USB LAN card driver program 66 sends the data to the application program 61 through the NDIS 62 or the VCOMM 64, according to the data format.

Figure 1:
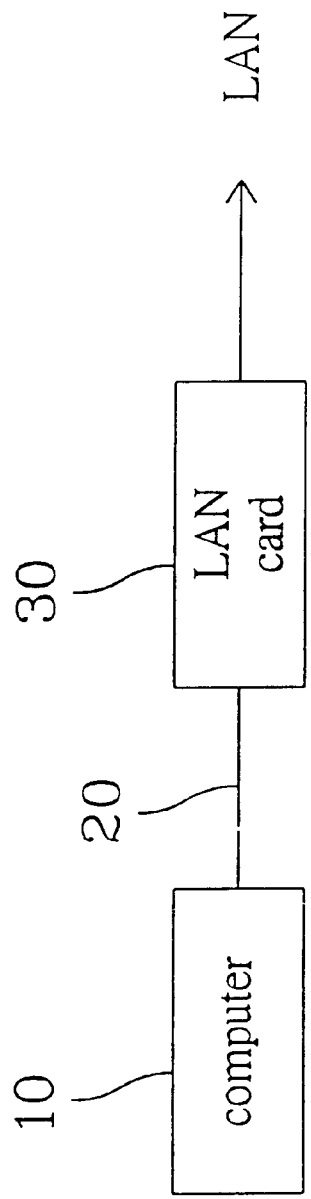
FIG. 1 shows a conventional computer peripheral design, wherein a computer is connected to a LAN card through a USB (universal series bus) to access LAN (Local Area Network)
Figure 2:
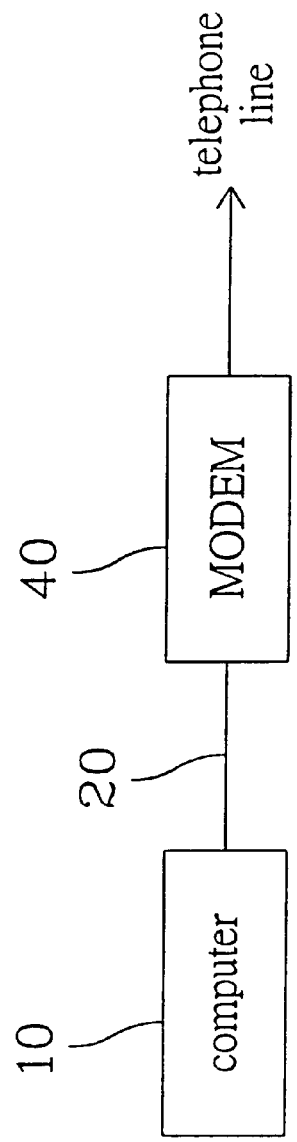
FIG. 2 shows another conventional computer peripheral design, wherein a computer is connected to a MODEM through a USB (universal series bus), and uses the MODEM to access network through telephone line.
Figure 3:
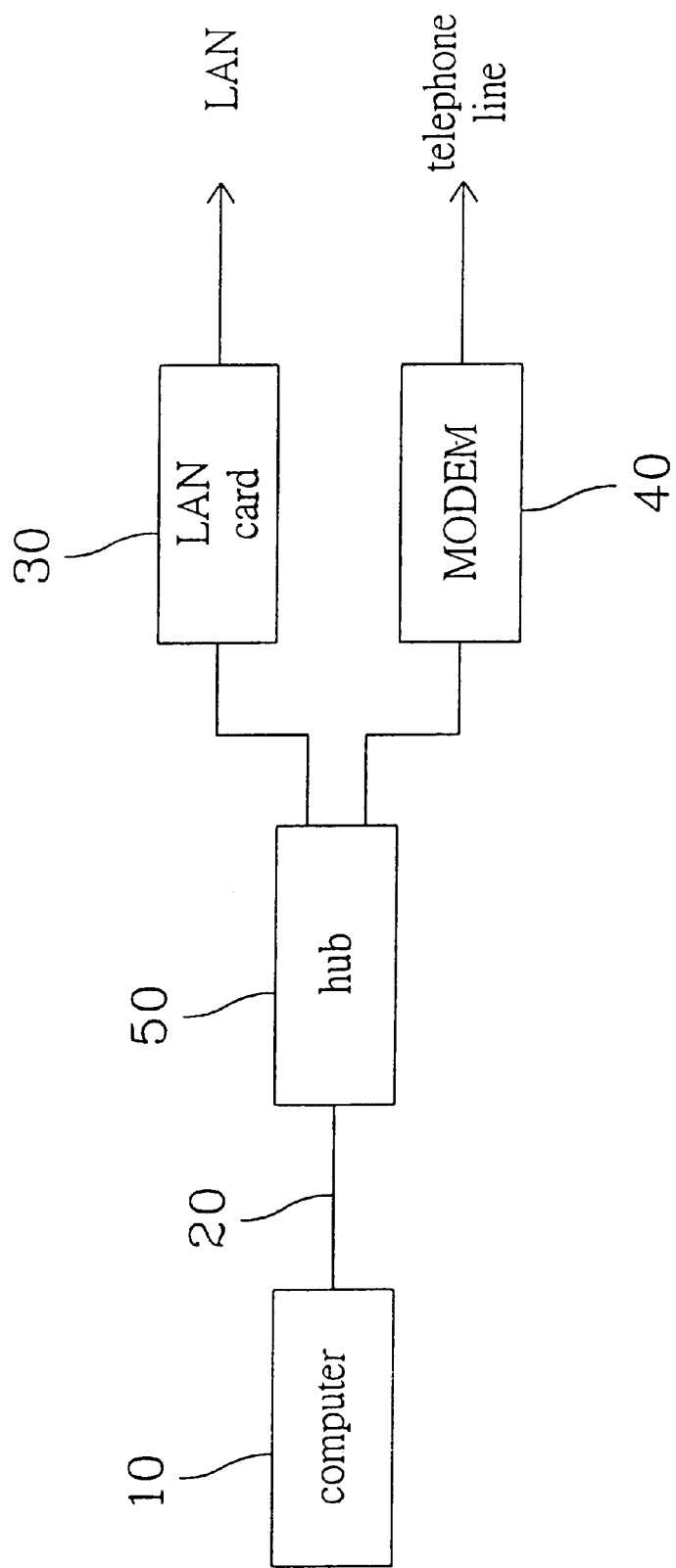
FIG. 3 shows still another conventional computer peripheral design, wherein a computer is connected to a hub through a USB such that the computer can simultaneous communicate to an LAN card and a MODEM through the hub.
Figure 4:
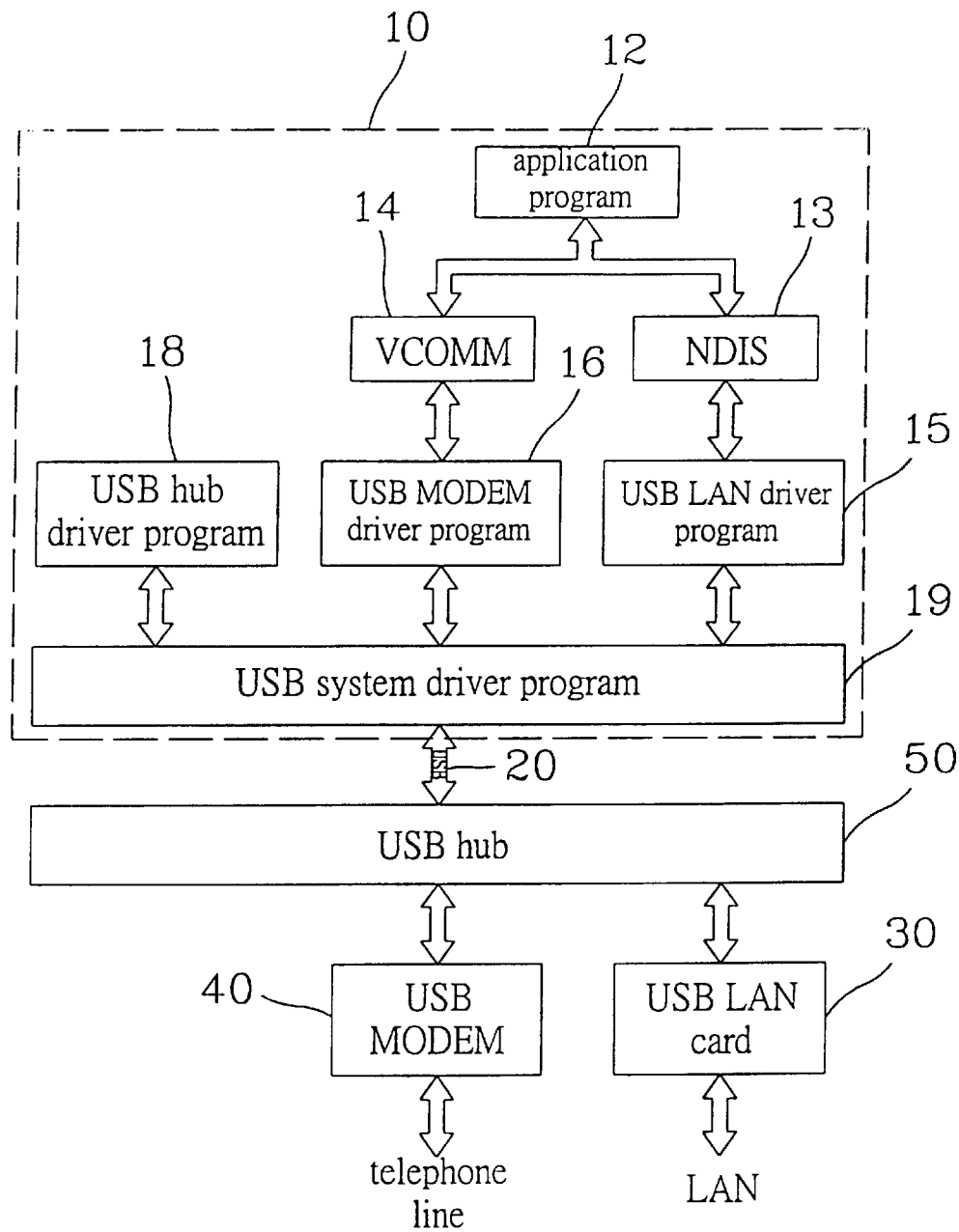
FIG. 4 shows the internal structure of the computer peripheral shown in FIG. 3.

As can be seen from FIGS. 4 and 5, the data collection and dispatch task is performed by an integral USB MODEM/USB LAN card driver program alone in the present invention, a USB hub is saved as compared with prior art. The cost is reduced. Moreover, the peripheral wiring of the computer 60 is simplified, and the power consumption is reduced, especially for notebook computer.

Moreover, in practical situation, other users on the LAN connected with the integral MODEM/LAN card peripheral 80 can share the resources of the computer 60 through the peripheral 80. Moreover, the users on the LAN connected with the integral MODEM/LAN card peripheral 80 can access Internet through the telephone line connected to the peripheral 80. The remote-end users of Internet can also connect to the computer 60 according to IP address assigned to the computer 60 and then connect to other users on the LAN connected to the computer 60, thus fully sharing resource in the network. More particularly, the present invention provides a combination solution for Internet and LAN such that the network manager can easily process remote control, IP- and MODEM-sharing.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An integral USB MODEM/USB LAN card peripheral, comprising a first connector connected to a computer;

a second connector connected to a telephone line;

a third connector connected to LAN;

a USB controller used to collect and dispatch internet data; the USB controller having a micro-controller connected to a first memory, and a USB SIE (serial bus interface engine) connected between the first connector and the micro-controller;

a MODEM module connected to the second connector;

an ether network media access controller connected to the third connector through a physical layer and connected to a second memory; and an internal bus connected to the micro-controller, the MODEM module and the ether network media access controller.

2. A communication system integrating LAN and MODEM, comprising a computer for controlling the input/output and the conversion of network data; the computer comprising a driving program providing an integral USB MODEM/USB LAN card driver program; the computer having an application program connected to the driving program through an NDIS (Network Device Interface Specification) and a VCOMM (Virtual Communication);

an integral USB MODEM/USB LAN card peripheral, comprising a first connector connected to a computer;

a second connector connected to a telephone line;

a third connector connected to LAN;

a USB controller used to collect and dispatch internet data; the USB controller having a micro-controller connected to a first memory, and a USB SIE (serial bus interface engine) connected between the first connector and the micro-controller;

a MODEM module connected to the second connector;

an ether network media access controller connected to the third connector through a physical layer and connected to a second memory; and an internal bus connected to the micro-controller, the MODEM module and the ether network media access controller; and a USB cable through which the USB controller is connected to the first connector.

* * * * *